United States Patent Office 2,875,032
Patented Feb. 24, 1959

2,875,032

PROCESS OF PREPARING A PHOSPHATED PRODUCT

Jacques Bursaux, Paris, Henri Ancelle, Neuilly-sur-Seine, and Henri de Saint Chamant, Paris, France, assignors to Comptoir des Phosphates de l'Afrique du Nord, Paris, France, a corporation of France No Drawing. Application October 30, 1952
Serial No. 317,846

Claims priority, application France November 16, 1951

5 Claims. (Cl. 71—41)

This invention relates to an improved phosphated substance valuable for use as a fertilizer, as cattle fodder, and similar purposes, as well as to methods of preparing said substance.

Phosphated fertilizers have been made and used for many years under such trade names as Basi-phosphate, Thermophosphate, Rhenania, etc., and have been produced by calcination of crude phosphates with soda carbonate or soda sulphate, sometimes with an addition of small quantities of silica thereto. Such fertilizers possess three main drawbacks: First, the assimilable phosphoric acid contained therein is generally quite low, of the order of about 24% to 28%, depending on the crude phosphate ore originally used. Second, their preparation requires the use of sodium substances in a comparatively valuable and expensive form, such as the carbonate and sulphate of soda. Third, they can be produced only by the use of the sodium derivatives; it has not so far been possible to prepare industrially fertilizers of similar type but containing potassium rather than sodium, despite the evident desirability of such potassium-containing fertilizers in agriculture.

It is an object of this invention to provide a new and improved phosphate-base product especially suitable for use as a soil fertilizer.

An object is to provide a phosphate-base product in which the content of assimilable phosphoric acid is substantially increased over that obtainable in comparable products of the prior art, and specifically to provide such a product in which said content will be in an approximate range of from 35% to 44% or higher.

A further object is to provide such a phosphate-base product which requires the use of comparatively low-cost alkaline constituents in the preparation thereof, and more specifically one in which the alkaline constituent may comprise one or more widely available natural alkali chlorides, such as sodium chloride, potassium chloride and mixtures thereof as derived from any of the usual sources of natural potash.

A further object is to provide such a phosphate-base product which can be readily produced either in a sodium-containing form, or in a potassium-containing form, or further in a composite form containing both sodium and potassium.

A further object is to provide such a phosphate base product by a thermal process.

A further object is to provide a novel fertilizer product containing potassium phosphate; and a related object is to provide a novel fertilizer product containing both sodium and potassium phosphate.

A further object is to provide such a product which will have a lower fluorine content than in comparable products of the prior art, and more specifically one in which the fluorine content will be of an approximate order as low as 0.2 to 0.3% or less. Such low fluorine contents in phosphate-base materials were heretofore obtainable only by resorting to de-fluorinating processes (e. g. processes involving calcination of a mixture of crude phosphate with silica in the presence of water vapor), but the resulting products had the disadvantageous feature of having low solubility in alkaline ammonia citrate. It is an object of the invention to provide a phosphate-base substance which will have a low fluorine content and yet possess high solubility.

Broadly, according to the invention, a mixture in suitable proportions, to be specified, of crude phosphate and alkali chlorides, with the possible addition of low quantities of carbon, is reacted with phosphoric acid to produce a comparatively dry pulp or paste, and the latter is then subjected to calcination at a temperature of approximately from 1,000° C. to 1,200° C., preferably in the presence of water vapor.

The composition of the initial mixture will to a certain extent depend on the characteristics of the crude phosphate used. Broadly speaking, the upper limit for the amounts of $P_2O_5$ and alkali to be added to 100 parts phosphate can be determined as follows: Given the $P_2O_5$ and CaO content in the crude phosphate, the amounts of phosphoric acid and alkali chlorides to be added to the crude phosphate should be such that the final composition of the mixture will correspond with the stoichiometrical formula $P_2O_5$, 2CaO, $Na_2O$ or $P_2O_5$, 2CaO, $K_2O$, as the case may be.

In practice, a highly assimilable product can be obtained by using quantities of phosphoric acid and alkali chlorides considerably lower than the above indicated theoretical quantities. Thus, the quantities of phosphoric acid and alkali chlorides used can be lower than the theoretical quantities by as much as 25% and 35% respectively. The optimum composition for the mixture can be determined only by tests with regard to the characteristics of the starting material used and the criterion adopted for the assimilability of the final product (solubility test). By adding some silica to the mixture, the proportions of phosphoric acid and alkali chlorides required may be substantially reduced, especially if the added silica is in a highly divided state.

The phosphate used should preliminarily be ground to a moderate degree of fineness (e. g. it should pass through the 35 mesh screen of the Tyler series). The titre of the phosphoric acid used is more or less immaterial. However, an acid containing about 40% $P_2O_5$ may advantageously be used.

The mixing step can be carried out in a mixer apparatus of any of the types currently used in the superphosphate fertilizer industry. It should, however, be noted that the mixture sets very rapidly (in about twenty seconds) and that the mixing apparatus should be devised so as to make allowance for this property. However, the setting of the mixture may be retarded by the use of relatively dilute phosphoric acid. The mixing step may be carried out on an endless conveyor band or the like. Moreover, the resulting pasty mixture is desirably made into granular form.

The comparatively dry granulated intermediate product obtained in the above described manner may be calcined in a kiln of any suitable type provided with an appropriate refractory lining (e. g. high alumina brick or chromium-magnesia brick). The following points should be kept in mind.

During an initial period of the calcining operation, the intermediate product should be maintained for a sufficient period of time, say one or two hours, at a temperature within the range of from 600° C. to 800° C.

During this initial period, the atmosphere within the kiln should contain a comparatively high amount of moisture (about 100 grams water vapor per cubic meter of combustion gases); this condition may for example be attained by firing the kiln with fuel oil and providing for an additional injection of steam into the kiln.

The duration of the final calcining period, in which the intermediate product is brought to a temperature range of from 1,000° C. to 1,200° C., can be made arbitrarily short.

As a general rule, it is very desirable to ensure that a good contact is had between the calcined solids and the furnace atmosphere. In the case of a rotary kiln, suitable brick baffles can for this purpose be arranged at suitable points of the kiln.

In order to provide for the continuous heating process described above, two furnaces may be used in series, or alternatively a single rotary furnace may be used having an enlargement corresponding to the lower-temperature zone in which the material should dwell a longer period of time.

The solubility of the resulting product can be substantially improved if the material is subjected to a sudden cooling at its discharge from the furnace, e. g. by receiving it in a strong current of cool air or in a fine water spray, or further on a drum provided with strong internal cooling means therein.

The combustion gases discharged from the kiln contain a large amount of hydrochloric acid and fluorine, partly in the form of hydrofluoric acid and partly in the form of hydrofluosilicic acid, depending on the silica content in the original phosphate used. Part or all of these gases can desirably be recovered, using any of the well-known procedures to this end.

The well cooled product is obtained in pulverulent form and may be used without any further treatment except breaking up. The product is not hydroscopic.

Owing it is very low fluorine content and its low silica content, the finely pulverized sodium product can be used to advantage as cattle fodder.

*Example 1*

Morocco phosphate from the Louis Gentil mine and having the following composition:

$P_2O_5$ ---- 31.4
$CaO$ ---- 49.2
$SO_3$ ---- 1.10
$SiO_2$ ---- 3.1 is treated for solubilizating by the process of the invention. A reaction mixture consisting of 100 kg of the above phosphate ground to 35 mesh of the Tyler series, 37 kg. of industrial sodium chloride, and 63 kg. of phosphoric acid containing 42% $P_2O_5$ is mixed to obtain a comparatively hard intermediate product which is air-dried by simply spreading it over the ground in a dry room. The dry material is then broken up into particles not larger than a few millimeters in size, then calcined using the two-stage procedure described, in a set of two kilns in series. The first kiln is 10 meters long and 1 m. inner diameter; the second kiln is 10 m. long and 0.6 m. inner diameter.

The burners are adjusted to provide a temperature of about 750° C. to 800° C. at the outlet of the first kiln and about 1,150° C. at the outlet of the second kiln. Steam is injected into the first kiln at a rate of 3 kg. steam per 100 kg. phosphate. The product discharged from the second kiln is received on a water-cooled rotating drum.

A fertilizer composition is thus obtained containing 43% total $P_2O_5$ and 42% $P_2O_5$ soluble in neutral ammonia citrate.

*Example 2*

Gafsa phosphate having the following composition:

$P_2O_5$ ---- 27.6
$CaO$ ---- 46.4
$SiO_2$ ---- 8.15
$F$ ---- 1.78 is treated by the method of the invention. The reaction mixture consists of 100 kg. of this phosphate, ground to 35 mesh (Tyler), 46 kg. of industrial sodium chloride, and 71 kg. of phosphoric acid containing 42% $P_2O_5$. The mixing and calcining operations are carried out as in Example 1.

A fertilizer composition is obtained containing 40% total $P_2O_5$, 39% $P_2O_5$ soluble in neutral ammonia citrate, and 36% $P_2O_5$ soluble in alkaline ammonium nitrate. The fluorine content is less than 0.5%.

What we claim is:

1. A method of preparing a phosphated product, which comprises subjecting a mixture of crude phosphate of calcium of an alkali metal chloride and of phosphoric acid in proportions equivalent stoichiometrically to the formula $2CaO \cdot M_2O \cdot P_2O_5$, were M is an alkali metal, in the presence of water vapor, to a continuous heat treatment, in the first part of which the said mixture is gradually calcined at between about 600° C. and about 800° C. for from about 1 to about 2 hours and in the subsequent second part of which the said mixture is gradually heated at between about 1000° C. and about 1200° C. for from about one-quarter of an hour to about 1 hour.

2. A method of preparing a phosphated product, which comprises mixing crude phosphate of calcium, an alkali metal chloride and phosphoric acid in proportions equivalent stoichiometrically to the formula $2CaO \cdot M_2O \cdot P_2O_5$, where M is an alkali metal, granulating the pasty mixture thus obtained, and subjecting the granulated product, in the presence of water vapor, to a continuous heat treatment, in the first part of which the said mixture is gradually calcined at between about 600° C. and about 800° C. for from about 1 to about 2 hours and in the subsequent second part of which the said mixture is gradually heated at between about 1000° C. and about 1200° C. for from about one-quarter of an hour to about 1 hour.

3. A method of preparing a phosphated product, which comprises first mixing crude phosphate of calcium and an alkali metal chloride, then adding phosphoric acid, the amounts of crude phosphate of calcium, of the alkali metal chloride and of phosphoric acid being determined so as to give a calcium alkali phosphate corresponding to the stoichiometric formula $2CaO \cdot M_2O \cdot P_2O_5$, where M is an alkali metal, and subjecting the said mixture in the presence of water vapor, to a continuous heat treatment, in the first part of which the said mixture is gradually calcined at between about 600° C. and about 800° C. for from about 1 to about 2 hours and in the subsequent second part of which the said mixture is gradually heated at between about 1000° C. and about 1200° C. for from about one-quarter of an hour to about 1 hour.

4. A method of preparing a phosphated product, which comprises subjecting a mixture of crude phosphate of calcium, of an alkali metal chloride and of phosphoric acid in proportions equivalent stoichiometrically to the formula $2CaO \cdot M_2O \cdot P_2O_5$, where M is an alkali metal, in the presence of water vapor, to a continuous heat treatment, in the first part of which the said mixture is gradually calcined at between about 600° C. and about 800° C. for from about 1 to about 2 hours and in the subsequent second part of which the said mixture is gradually heated at between about 1000° C. and about 1200° C. for from about one-quarter of an hour to about 1 hour, and then suddenly cooling the obtained product.

5. A method of preparing a phosphated product, which comprises subjecting a mixture of crude phosphate of calcium, of an alkali metal chloride and of phosphoric acid in proportions equivalent stoichiometrically to the formula $2CaO \cdot M_2O \cdot P_2O_5$, where M is an alkali metal, in the presence of water vapor, to a continuous heat treatment, in the first part of which the said mixture is gradually calcined at between about 600° C.

and about 800° C. for from about 1 to about 2 hours and in the subsequent second part of which the said mixture is gradually heated at between about 1000° C. and about 1200° C. for from about one-quarter of an hour to about 1 hour.

References Cited in the file of this patent

UNITED STATES PATENTS

| Number | Name | Date |
|---|---|---|
| 1,806,029 | Thorssell | May 19, 1931 |
| 1,859,738 | Johnson | May 24, 1932 |
| 1,869,879 | Balz et al. | Aug. 2, 1932 |
| 2,164,627 | Seyfried | July 4, 1939 |
| 2,337,498 | Ritter et al. | Dec. 21, 1943 |
| 2,479,389 | Maust et al. | Aug. 16, 1949 |
| 2,556,541 | Hollingsworth | June 12, 1951 |
| 2,562,718 | Hollingsworth | July 31, 1951 |
| 2,636,806 | Winter | Apr. 28, 1953 |

FOREIGN PATENTS

| Number | Country | Date |
|---|---|---|
| 376,934 | Great Britain | July 31, 1932 |

UNITED STATES PATENT OFFICE
CERTIFICATE OF CORRECTION

February 24, 1959

Patent No. 2,875,032

Jacques Bursaux et al.

It is hereby certified that error appears in the printed specification of the above numbered patent requiring correction and that the said Letters Patent should read as corrected below.

Column 3, line 34, for "Owing it is very low fluorine content" read -- Owing to its very low fluorine content --; column 5, line 5, after "1 hour" and before the period insert -- ; and then recovering the evolved hydrochloric and hydrofluoric acids --.

Signed and sealed this 16th day of June 1959.

(SEAL)
Attest:

KARL H. AXLINE
Attesting Officer

ROBERT C. WATSON
Commissioner of Patents